US008157403B2

(12) United States Patent
Lau

(10) Patent No.: US 8,157,403 B2
(45) Date of Patent: Apr. 17, 2012

(54) LIGHT DEVICE WITH DETACHABLE CLIP MEMBER

(76) Inventor: Chi Hung Fermi Lau, Kowloon (HK)

( * ) Notice: Subject to any disclaimer, the term of this patent is extended or adjusted under 35 U.S.C. 154(b) by 355 days.

(21) Appl. No.: 12/454,347

(22) Filed: May 15, 2009

(65) Prior Publication Data

US 2010/0289433 A1 Nov. 18, 2010

(51) Int. Cl.
*F21L 4/04* (2006.01)
*H04M 1/22* (2006.01)

(52) U.S. Cl. .................. 362/106; 362/190; 362/249.11; 362/396

(58) Field of Classification Search .................. 362/105, 362/106, 184, 190, 191, 249.01, 249.02, 362/249.11, 396
See application file for complete search history.

(56) References Cited

U.S. PATENT DOCUMENTS

| | | | | |
|---|---|---|---|---|
| 2,524,881 A * | 10/1950 | Chambers | ..................... | 362/190 |
| 3,032,647 A * | 5/1962 | Wansky et al. | ............... | 362/191 |
| 4,406,040 A * | 9/1983 | Cannone | ..................... | 362/106 |
| 5,460,346 A * | 10/1995 | Hirsch | ..................... | 362/190 |
| 6,604,837 B2 * | 8/2003 | Sandberg | ..................... | 362/191 |
| 6,619,813 B1 * | 9/2003 | Schnell | ..................... | 362/116 |
| 6,953,259 B2 * | 10/2005 | Parsons et al. | ............... | 362/191 |
| 7,178,933 B1 * | 2/2007 | Chuang | ..................... | 362/106 |
| 7,240,883 B2 * | 7/2007 | Liao | ..................... | 362/106 |
| 7,703,952 B2 * | 4/2010 | Yoon | ..................... | 362/191 |
| 2007/0109768 A1 * | 5/2007 | Sohn | ..................... | 362/106 |
| 2008/0232092 A1 * | 9/2008 | Carter | ..................... | 362/106 |
| 2010/0301779 A1 * | 12/2010 | Spartano et al. | .............. | 362/191 |

* cited by examiner

*Primary Examiner* — Ismael Negron
(74) *Attorney, Agent, or Firm* — Raymond Y. Chan; David and Raymond Patent Firm

(57) ABSTRACT

A clip light, for detachably mounting the clip light to a visor of a cap, includes a light arrangement and a detachable clip member. The light arrangement includes a light housing and a light device supported within the light housing, wherein the detachable clip member is detachably coupling with the light housing, wherein the detachable clip member is adapted to be detached for replacing to another type of clip member for different purposes. The detachable clip member is rotatably coupling with the light housing, such that a projecting angle of the light from the light source is adapted to be adjusted via a rotation manner.

6 Claims, 7 Drawing Sheets

LIGHT DEVICE WITH DETACHABLE CLIP MEMBER

BACKGROUND OF THE PRESENT INVENTION

1. Field of Invention

The present invention relates to an illumination device, and more particularly to a clip light, which comprises a detachable clip member for detachably mounting at a visor of a cap with a predetermined curvature thereof and for selectively swiveling the light housing to adjust an orientation of the light source so as to adjust the direction of the light beam.

2. Description of Related Arts

Light emitting apparatus mounted on a headband, or coupled at a brim of a hat or a cap have been widely applied for illuminating a dark working area for the freedom of both hands. A LED headlight is a well known type of lighting apparatus detachably coupling at the brim of the cap to illuminate the front crown working area. Take a clipper headlight for example, the clipper headlight has a clipper portion integrally provided at the headlight for attaching the headlight to a baseball type cap. In order to match the curve shape of the brim of the baseball type cap, the clipper on the headlight has a curve shape for detachably mounting on the front brim of the cap in a specific position.

However, the integrated clipper with the headlight is limited of applications. The headlight of fixed curve clipper cannot be reversely coupled to the top side of the brim of the cap. In other words, the headlight must clip at the bottom side of the brim of the cap such that the headlight will block a wearer vision. In addition, the headlight with fixed curve clipper has to be detachably mounted in a certain position on the brim of the cap for stably matching the curve of the baseball type cap. Furthermore, the clipper headlight fixed on the cap or the likes are fixedly toward in one direction only and can hardly be adjusted the projection of the light beam of the headlight to project to the working area. Additionally, the clipper integrated mounted on the headlight can not be detached to switch the clipper for different circumferences.

SUMMARY OF THE PRESENT INVENTION

A main object of the present invention is to provide a clip light for detachably mounting on a cap, wherein the clip light is detachably mounting on a visor of the cap for illumination.

Another object of the present invention is to provide a clip light for detachably mounting on a cap, wherein a detachable clip member is detachably mounted on a light housing, so that the detachable clip member can be detached for replacing a different type of clip member.

Another object of the present invention is to provide a clip light for detachably mounting on a cap, wherein the detachable clip member comprises two spaced apart clipping arms to fit with any curvature of the visor of the cap. In addition, the clip light can clip at either the top side or the bottom side of the visor of the cap.

Another object of the present invention is to provide a clip light for detachably mounting on a cap, wherein the detachable clip is rotatably coupling with the light housing, such that a projecting light from the light housing is adjustable in a rotatable manner.

Another object of the present invention is to provide a clip light for detachably mounting on a cap, wherein the detachable clip member can be mounted on a relatively larger range of a curvature of an object such as the curvature of the visor of the cap.

Accordingly, in order to accomplish the above objects, the present invention provides a clip light comprising a light arrangement and a detachable clip member. The light arrangement comprises a light housing and a power source. The light housing has a front light window and an attachment surface. The light device comprises a power source supported within the light housing, and a light source electrically connected to the power source and aligned with the light window for generating a light beam towards the light window. The detachable clip member is detachably coupling with the attachment surface for detachably clipping at the light arrangement at the visor of the cap.

Thus, the clip light with the detachable clip member can detach the clip member to replace the clip member for different purposes. The clip member comprises two spaced apart clipping arms enhances the ability for mounting the clip light on different curvature objects.

These and other objectives, features, and advantages of the present invention will become apparent from the following detailed description, the accompanying drawings, and the appended claims.

DETAILED DESCRIPTION OF THE PREFERRED EMBODIMENT

Figure 1:
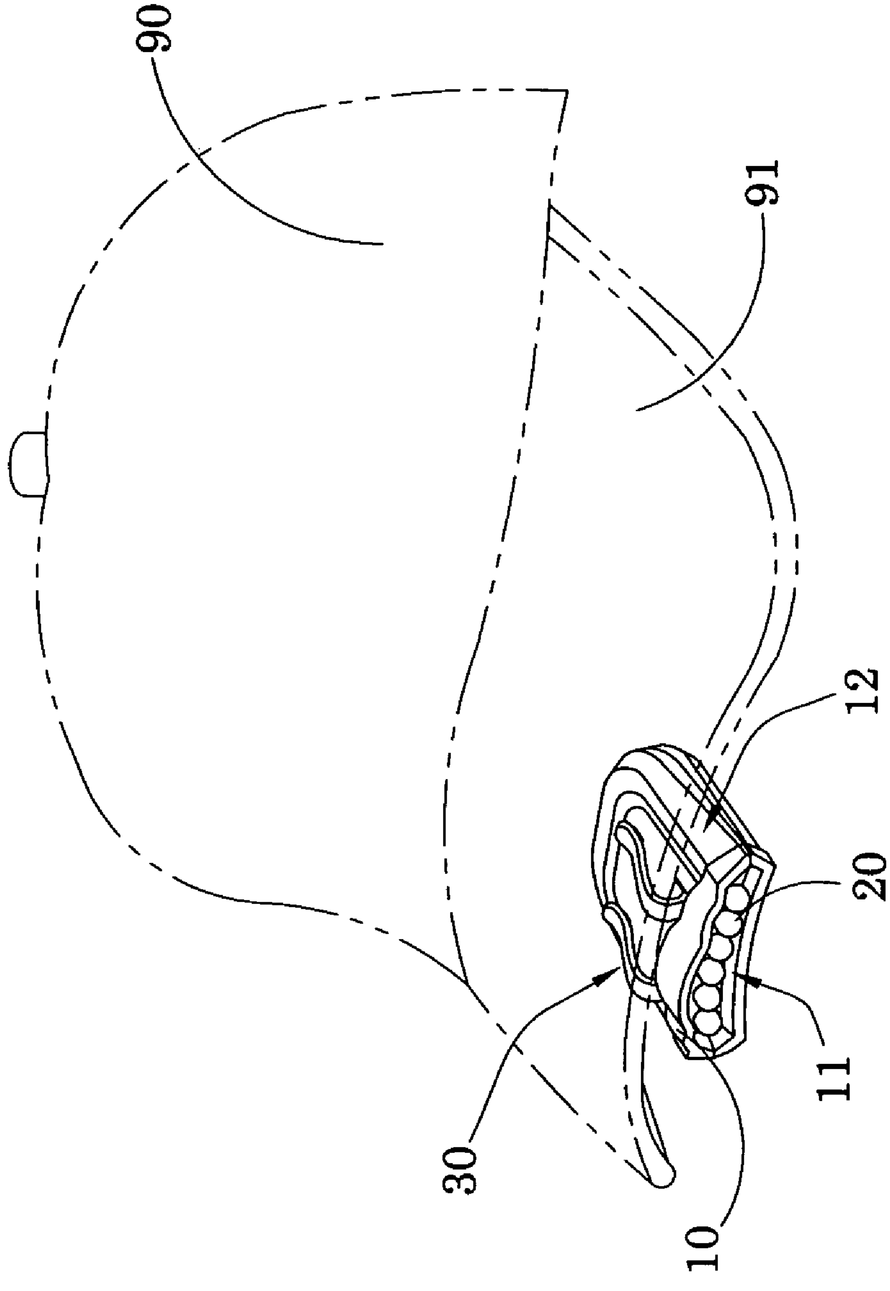
FIG. 1 is a perspective view of a clip light according to a preferred embodiment of the present invention.

Referring to FIGS. 1 to 4 of the drawings, a clip light according to a preferred embodiment of the present invention is illustrated, wherein the clip light is adapted for detachably mounting at a visor 91 of a cap 90, such as a leisure cap or safety cap. Accordingly, the clip light comprises a light arrangement and a detachable clip member 30.

The light arrangement comprises a light housing 10 having a front light window 11 and an attachment surface 12, and a light device 20 which comprises a power source 21 supported within the light housing 10, a light source 22 electrically connected to the power source 21 and aligned with the light window 12 for generating a light beam towards the light window 12.

The detachable clip member 30 is detachably coupling with the attachment surface 12 of the light housing 10 for detachably clipping at the light arrangement at the visor 91 of the cap 90. Accordingly, the light housing 10 generally has a rectangular shape, wherein the attachment surface 12 of the light housing 10 is a top enlarged surface thereof for the detachable clip member 30 detachably coupling thereat.

Figure 2:
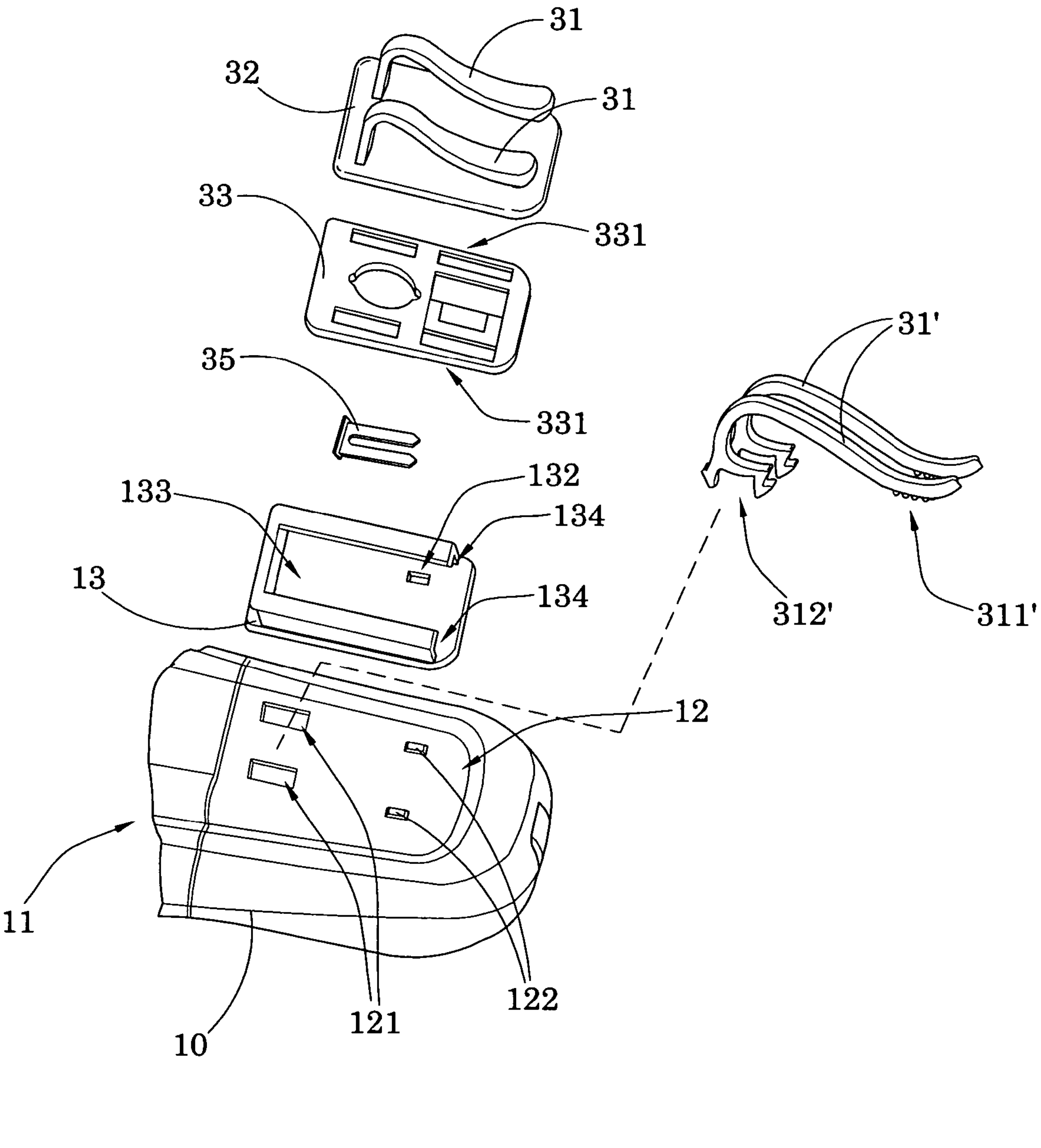
FIG. 2 is a top exploded perspective view of the clip light according to the above preferred embodiment of the present invention, illustrating the detachable clip member and its alternative.

As shown in FIG. 2, the detachable clip member 30 comprises two spaced apart clipping arms 31 extended from the attachment surface 12 of the light housing 10 for adjustably clipping at the visor 91 of the cap 90 with a predetermined curvature. It is worth mentioning that the two spaced apart clipping arms 31 are matching a relatively larger curvature range of an object such as the curvature of the visor 91 of the cap 90, so that the clip light can be detachably mounted to different objects having different curvature, or the clip light can be reversely mounted on a top of the visor 91 of the cap 90 for preventing the clip light from blocking a view of the wearer.

Figure 5:
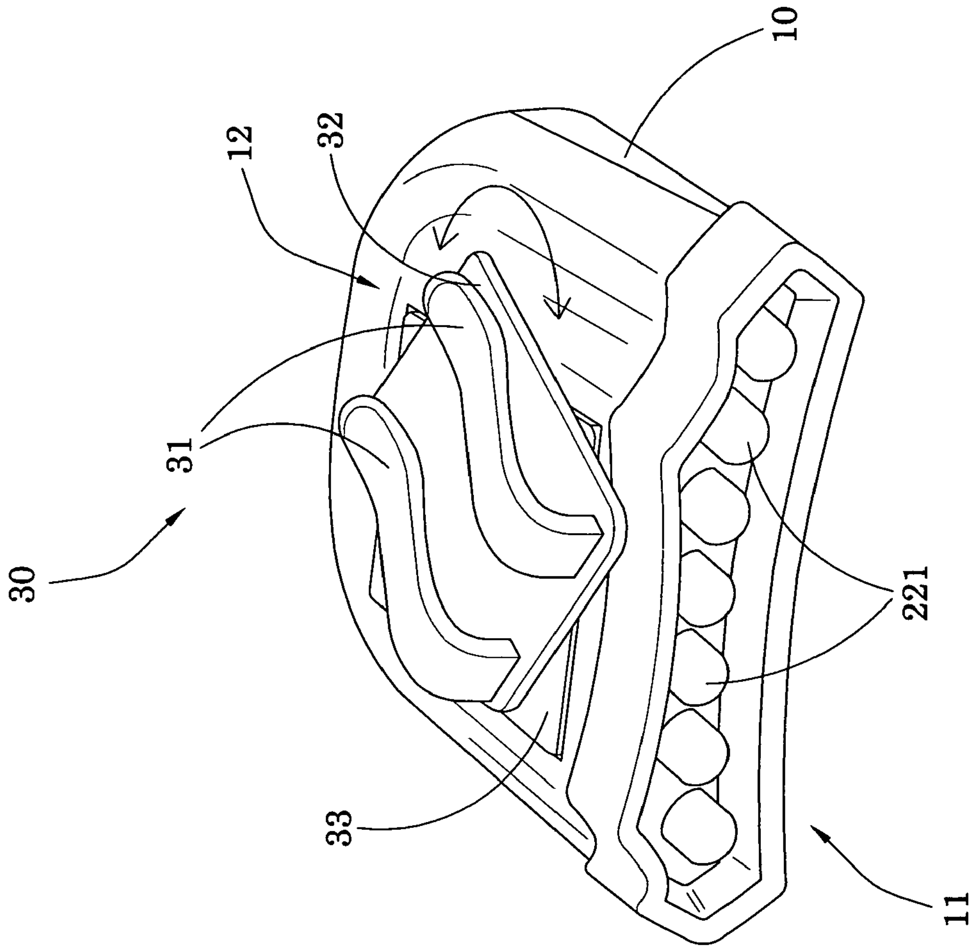
FIG. 5 is a perspective view of the clip light according to the above preferred embodiment of the present invention, illustrating the swiveling movement of the light housing.

The clip member 30 further comprises a rotatable base 32 adapted for the clipping arms 31 spacedly being mounted at the rotatable base 32, and a retention base 33 for rotatably coupling and receiving the rotatable base 32. The retention base 33 is detachably coupling with the attachment surface 12 of the light housing 10, so that the clipping arms 31 are rotatably and detachably coupling with the light housing 10 of the light arrangement through the retention base 33 coupling with the rotatable base 32, in such a manner that the light housing 10 is adapted to selectively swivel to adjust a light projecting angle when the detachable clip member 30 is clipped at the visor 91 of the cap 90, as shown in FIG. 5.

The detachable clip member 30 comprises a first fastener 34 extended from the rotatable base 32 and a second fastener 35 for rotatably fastening with the first fastener 34, wherein the first fastener 34 is slidably passing through a through hole on the retention base 33 to fasten with the second fastener 35. In order words, the retention base 33 is rotatably retained via the attachment between the first fastener 34 and the second fastener 35, in such a manner that the rotatable base 32 is rotatably coupling with the retention base 33 by the first fastener 34 and the second fastener 35.

The light housing 10 further has a receiving cavity 133 indently provided at the attachment surface 12 for detachably receiving the detachably clip member 30 at the receiving cavity 133. In particularly, two sliding tracks 134 are formed at two sidewalls of the receiving cavity 133 to slidably engage with two side edges of the detachable clip member 30 in a detachably attaching manner.

Figure 3:
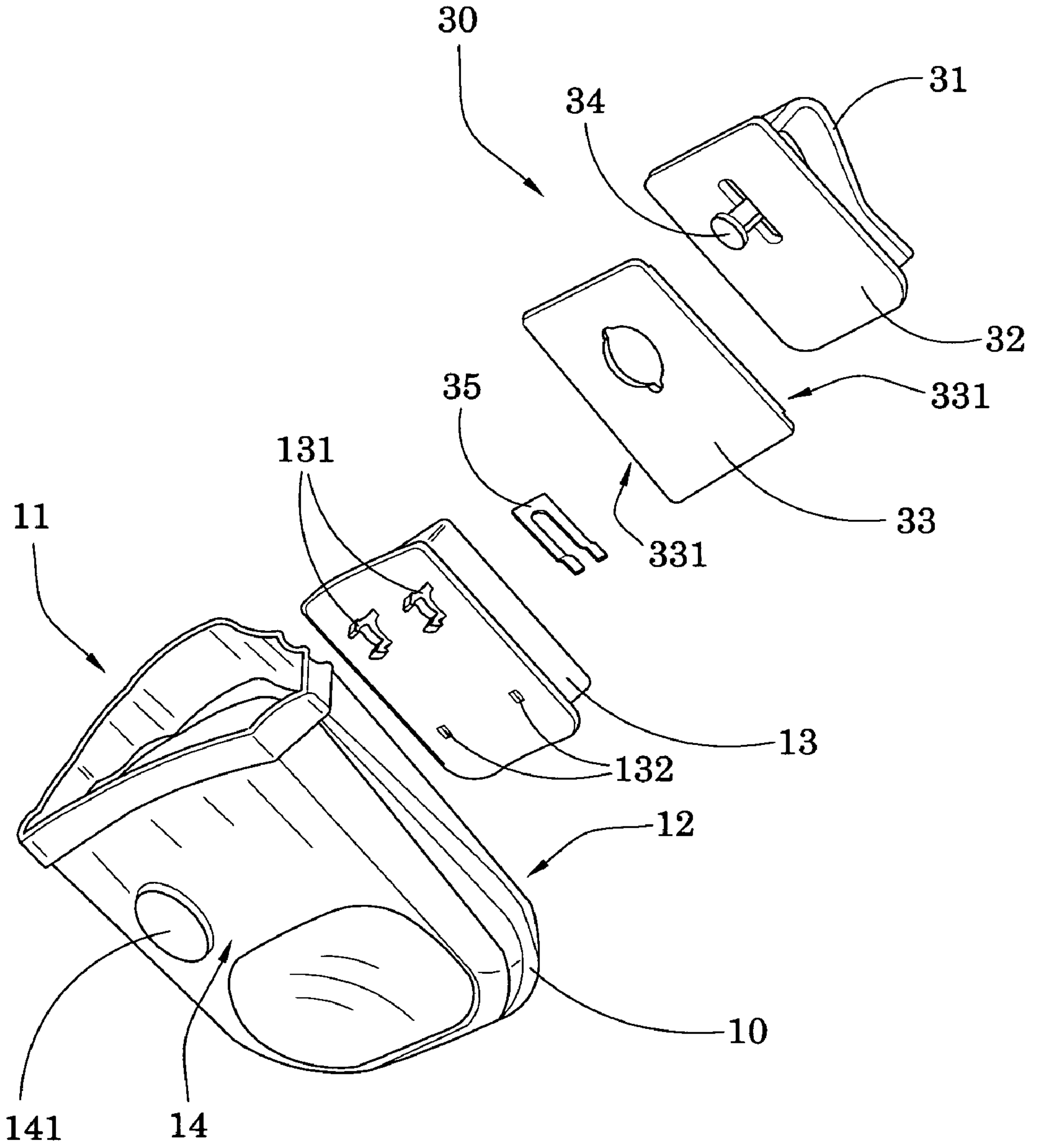
FIG. 3 is a bottom exploded perspective view of the clip light according to the above preferred embodiment of the present invention.

As shown in FIGS. 2 and 3, the light housing 10 further comprises a clip adaptor 13 detachably engaging with the attachment surface 12 of the light housing 10 for slidably receiving the detachable clip member 30. The attachment surface 12 has two engaging slots 121 indented from the attachment surface 12 and two protruding portions 122 protruded out from the attachment surface 12 for respectively receiving two protrusions 131 and two engaging holes 132 of the retention base 33, so as to detachably couple with the retention base 33 of the detachable clip member 30.

In particularly, the receiving cavity 133 is defined at the clip adaptor 13 to receive the retention base 33, wherein the sliding tracks 134 are formed respectively at the two sidewalls of the receiving cavity 133 for slidably receiving two side edges 331 of the retention base 33 of the detachable clip member 30. Therefore, the detachable clip member 30 is slidably and detachably coupling with the attachment surface 12 of the light housing 10, so as to retain the detachable clip member 30 on the attachment surface 12 of the light housing 10 in the swiveling manner, as shown in FIG. 5. It is worth mentioning that the detachable clip member 30 can be directly mounted at the attachment surface 12 of the light housing 10 without the clip adaptor 13, as shown in FIG. 5, by modifying the attachment of the clip adaptor 13 to the retention base 33.

The power source 21 of the light device 20 provided within the light housing 10 of the light arrangement comprises a battery compartment 211 adapted for receiving one or more batteries, and a compartment enclosure 212 provided for detachably enclosing the battery compartment 211, wherein the compartment enclosure 212 is detachably provided at the attachment surface 12 of the light housing 10 to form as a part of the attachment surface 12 of the light housing 10. Accordingly, the compartment enclosure 212 is detachable coupling with the attachment surface 12 of the light housing 10 as the part of the attachment surface 12 to enclose the battery compartment 211.

The light source 22 of the light device 20 of the light arrangement can be a bulb, LED, or the like, and is preferably using the LED, wherein the light source 22 comprises a plurality of LEDs 221 spacedly and longitudinally supported within the light housing 10. The LEDs 221 of the light source 22 are electrically connected to the power source 21 powered by the batteries within the battery compartment 211 to provide an electricity to the light source 22 for generating a light beam of the LEDs 221 of the light source 22, such that the LEDs 221 of the light source 22 are aligned with the front light window 11 of the light housing 10 to project the light beam through the front light window 11.

The light housing 10 has an unattachment surface 14 located at an opposite site of the attachment surface 12 of the light housing 10, wherein a control switch 141 is provided at the unattachment surface 14 and electrically connected to the power source 21 of the light device 20, so that the control switch 141 is adapted for controlling the clip light in an on-and-off manner. It is worth to mention that the light arrangement can be either mounted at the top side or the bottom side of the visor 91 of the cap 90 via the detachable clip member 30 at the attachment surface 12 of the light housing 10. Therefore, the wearer is able to actuate the control switch 141 at the unattachment surface 14 of the light housing 10 to control the light device.

Accordingly, the light source is electrically controlled by the control switch 141 to turn on the LEDs 221 of the light source 22 to generate the light beam from the LEDs, wherein the LEDs supported within the light housing 10 are aligned with the front light window 11 to project the light beam through the light window 11, such that the clip light is detachably mounted on the visor 91 of the cap 90 to illuminate the dark area in front of the wearer of the cap 90.

In addition, when the clip light detachably mounted on the visor 91 of the cap 90, the light arrangement is rotatable to adjust the project angle of the light projected from the front light window 11 of the light housing 10 by rotating the light housing 10 through the rotation between the rotatable base 32 and the retention base 33 of the detachable clip member 30, as shown in FIG. 5. Therefore, the projecting angle of the clip light can be rotatably adjusted to an angle or working area as needed.

It is worth mentioning that the control switch 141 is provided on the opposite side of detachable clip member 30 on the attachment surface 12 of the light housing 10, such that the control switch 141 provided on the unattachment surface 14 can be relatively easier to access.

Figure 4:
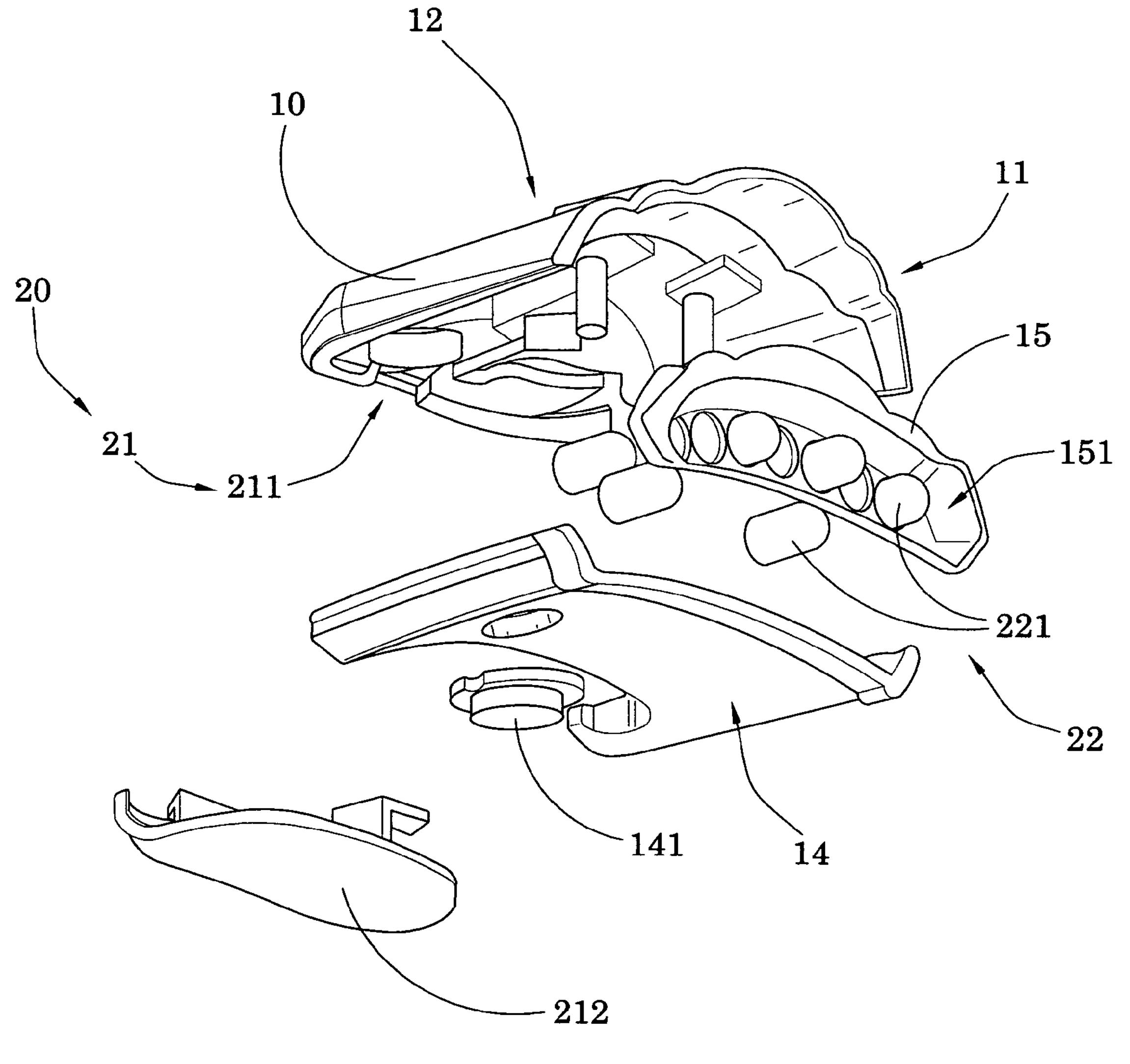
FIG. 4 is an exploded perspective view of the light arrangement of the clip light according to the above preferred embodiment of the present invention.

As shown in FIG. 4, the light housing 10 further comprises a light reflection housing 15 having a reflection surface 151 provided to reflectively enhance the light intensity of the clip light by reflecting the light beam generated from the LEDs 221 of the light source 22, wherein the LEDs 221 are electrically connected to the power source 21 and supported within the light reflection housing 15, such that the light beam from the LEDs 221 and the reflected light reflected from the reflection surface 151 are projected out through the front light window 11 of the light housing 10.

The light housing 10 further comprises a transmissible cover for enclosing and protecting the light reflection housing 15 at the front light window 11 and the LEDs 221 of the light source 22 within the light housing 10, so that the light generated from the LEDs 221 are projecting through the transmissible cover of the front light window 11.

Figure 6:
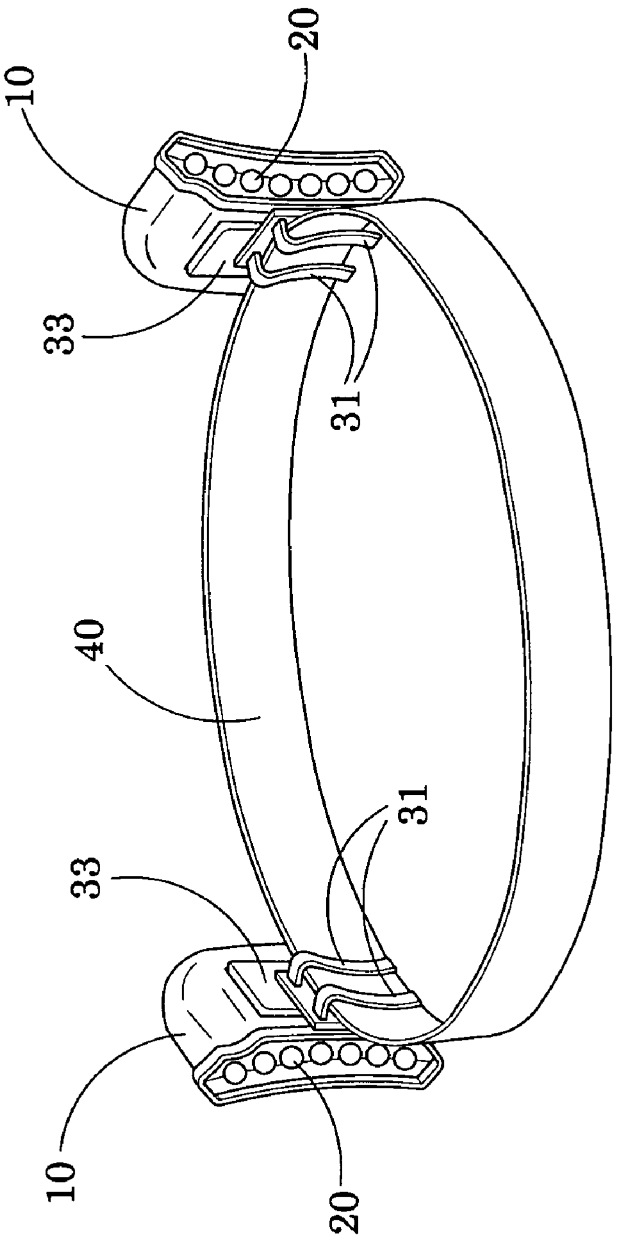
FIG. 6 is a perspective view of the clip light according to the above preferred embodiment of the present invention, illustrating the clip light being clipped at the head band.

As shown in FIG. 6 of the drawings, the clip light of the present invention is further incorporated with an elastic head band 40 provided for wearing on a head of the wearer in a hand-free manner, wherein two clip lights are detachably mounted on the head band 40 via the detachable clip members 30 and located at an opposite side to each other, so that the two clip lights provide a relatively higher light intensity and a different projecting angle for illuminating the working area.

Figure 7:
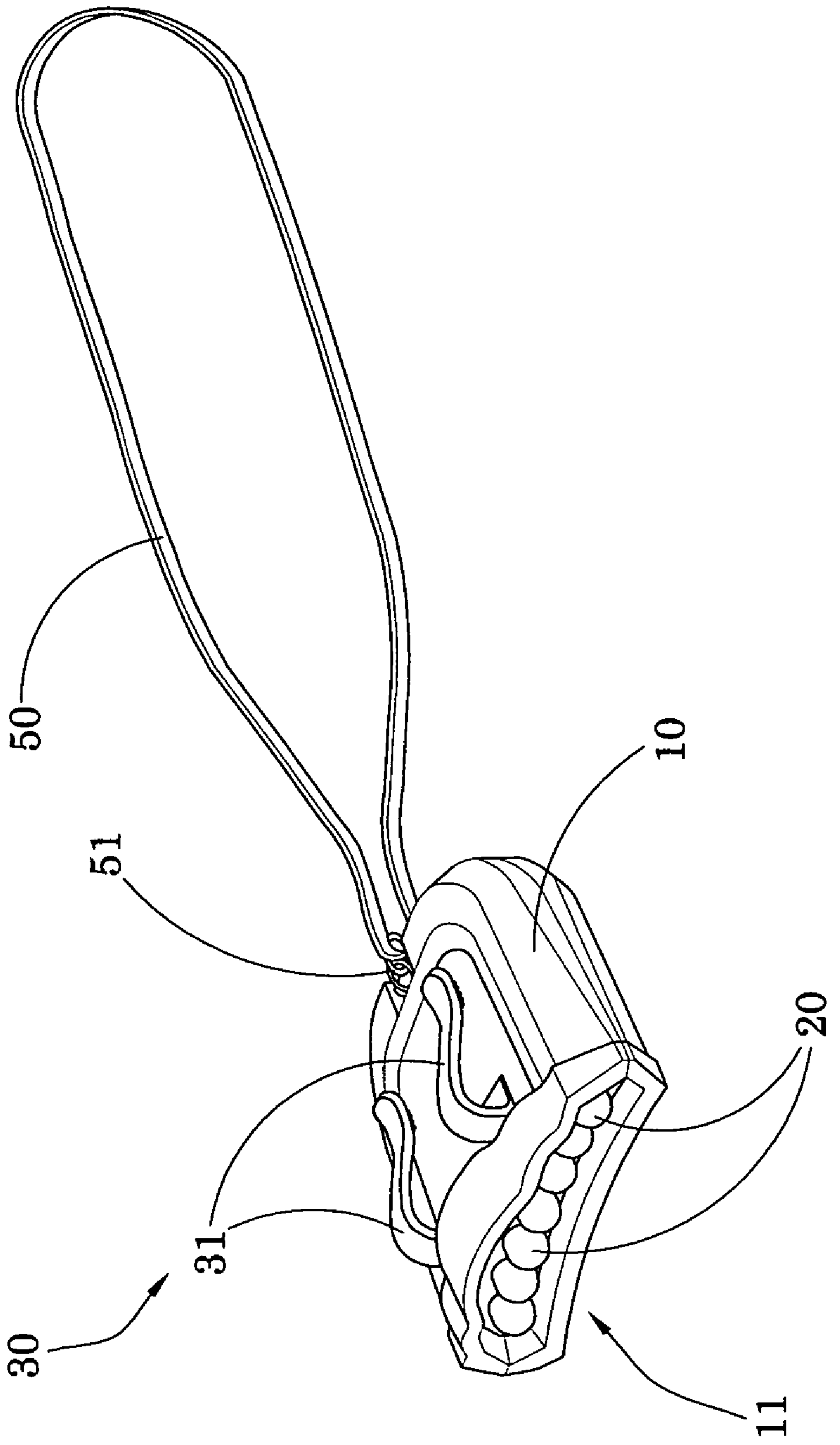
FIG. 7 is a perspective view of the clip light according to the above preferred embodiment of the present invention, illustrating the clip light being fastened with a necklace.

As shown in FIG. 7, the clip light comprises a buckle ring 51 mounted at an opposite side of the front light window 11 for connecting a strip 50 with the clip light, such that the clip light is worn on a neck of the wearer for portability, so as to be used as a flash light.

Referring to FIG. 2 of the drawings, an alternative clipping arms 31' of the detachable clip member 30 according to the preferred embodiment of the present invention is illustrated, wherein the clipping arms 31' has a clipping end 311' for clipping the visor 91 of the cap 90, and a detachable engaging end 312' for detachably engaging with the attachment surface 12 of the light housing 10, so that the clip light is detachably mounted on the visor 91 of the cap 90 through the clipping arms 31' of the detachable clip member 30.

The detachable engaging end 312' of the clipping arms 31' has a size and shape geographically matching the size and shape of the two engaging slot 121 of the attachment surface 12 of the light housing 10, such that the clipping arms 31' of the detachable clip member 30 are detachably and directly engaging with the attachment surface 12 of the light housing 10.

It is appreciated that the detachable clip member 30 provide a convenient way for changing different types of detachable clip member 30, so that the clip light is widely applied on various objects or purpose as the wearer desired. The wearer can choose the clipping arms 31' detachably engaging with the attachment surface 12 of the light housing 10 without the rotatable base 32 and the retention base 33 for reducing an overall weight of the clip light.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A light device for a cap having a visor with a predetermined curvature, comprising:

a light housing having a front light window, an attachment surface, and a receiving cavity indently provided at said attachment surface;

a power source supported within said light housing, a light source electrically connected to said power source and aligned with said light window for generating a light beam towards said light window; and a detachable clip member detachably received at said receiving cavity to couple the light device to said visor of said cap, such detachable clip member having two spaced apart clipping arms extended from said attachment surface of said light housing for adjustably coupling to said visor of said cap, a retention base detachably coupling with said attachment surface of said light housing, and a rotatable base rotatable coupling with said retention base;

wherein said clipping arms are spacedly mounted at said rotatable base in such a manner that said light housing is adapted to selectively swivel to adjust a light projecting angle when said detachable clip member coupled to said visor of said cap.

2. The light, as recited in claim 1, wherein said light housing further has 5 two sliding tracks formed at two sidewalls of said receiving cavity to slidably engage with two side edges of said detachable clip member in a detachably attaching manner.

3. The light, as recited in claim 2, wherein two side edges of said retention base are slidably engaged with said sliding tracks to retain said detachable clip member on said attachment surface of said light housing in a swiveling manner.

4. The clip light, as recited in claim 3, wherein said light source comprises a plurality of LEDs spacedly and longitudinally supported within said light housing to align with said light window.

5. The light, as recited in claim 4, wherein said power source comprises a battery compartment provided in said light housing for receiving one or more batteries in said battery compartment, and a compartment enclosure detachably coupled at said attachment surface of said light housing to enclose said battery compartment.

6. The clip light, as recited in claim 5, wherein said light source further comprises a control switch provided at an unattachment surface, which is an opposed to said attachment surface, to selectively control said light source in an on and off manner.

* * * * *